UNITED STATES PATENT OFFICE.

JAMES H. GOARD, OF ELIZABETH, ILLINOIS, ASSIGNOR OF PART OF HIS RIGHT TO PETER GABLE, W. F. CRUMMER, JAMES CRUMMER, AND B. F. CRUMMER, OF SAME PLACE.

IMPROVEMENT IN COMPOUNDS FOR PRESERVING LEATHER.

Specification forming part of Letters Patent No. 157,597, dated December 8, 1874; application filed August 6, 1874.

*To all whom it may concern:*

Be it known that I, JAMES H. GOARD, of Elizabeth, in the county of Jo Daviess and in the State of Illinois, have invented certain new and useful Improvements in Preserving Leather; and do hereby declare that the following is a full, clear, and exact description thereof.

The nature of my invention consists in a compound or oil for preserving leather, harness, and other similar articles, as will be hereinafter more fully set forth.

My compound is composed of the following ingredients, and in substantially the following proportions, viz: Fresh melted butter, eight gallons; fresh melted tallow, four gallons; oil of cinnamon, one ounce; lamp or bone black, one-fourth pound.

The butter is placed in a large kettle and placed over a fire to bring it to boiling, all the time skimming off the dirt or cream that comes to the top. The butter will have to be brought to a boil two or three times, in order to get rid of all the milk and cream, as nothing but the pure oil of the butter must be used, because if not purified it will form a gum on the leather, or cause the leather to become white in a short time. The beef-tallow must also be pure and strained, and when both are thus purified in separate vessels they must both be heated, and just as they come to a boil the one is poured in the other. The lamp or bone black is then put in, and then the oil of cinnamon, after which the whole is stirred thoroughly until nearly cool, when it is ready for use.

The lamp or bone black is simply used to give the oil color, and the oil of cinnamon used to take away all the smell of the butter and tallow, and leave the oil with a pleasant smell. Any equivalent material may be used in place of these two ingredients that will answer the same purpose.

The butter keeps the leather soft, and the tallow sheds water.

The oil thus prepared will keep harness soft, no matter how much exposed to rain or mud. If the harness gets covered with mud it can easily be washed off with a little soap and water and a sponge without any trouble, as the oil forms no gum, but leaves the harness black and soft.

The oil will not wash out, and will not draw out on the outside of the leather by the sun shining on it. On the contrary, the more it is exposed to the sun the farther in it goes.

In applying the oil, the harness must first be washed clean, and when almost dry the oil is to be warmed until it becomes thin, and then it is applied freely to the harness in a warm place. For nice light harness, after it is oiled, it should be sponged off with castile-soap, as this takes off all surplus oil, and gives a gloss to the leather.

I do not confine myself to the exact proportions of the ingredients mentioned, as they may, perhaps, be varied to suit different kinds of leather to be oiled.

Having thus fully described my invention, what I claim as new, and desire to secure by Letters Patent, is—

1. The within-described compound for harness-oil, consisting of butter, beef-tallow, and oil of cinnamon, or its equivalent, substantially as herein set forth.

2. In combination with a preservative compound for leather, consisting of butter, beef-tallow, and oil of cinnamon, a coloring material of lamp or bone black, as and for the purposes set forth.

In testimony that I claim the foregoing I have hereunto set my hand this 3d day of July, 1874.

JAMES H. GOARD.

Witnesses:
 H. A. HALL,
 C. L. EVERTS.